United States Patent [19]
Elia et al.

[11] Patent Number: 4,892,473
[45] Date of Patent: Jan. 9, 1990

[54] HEAD FOR EXTRUSION OF ELASTOMERIC CONTOUR INNERLINER

[75] Inventors: Gerardo P. Elia, Akron, Ohio; Gaetan Arbour, Joliette, Canada; Ivan Z. Podobnik, Stow, Ohio

[73] Assignee: Bridgestone/Firestone, Inc., Akron, Ohio

[21] Appl. No.: 288,594

[22] Filed: Dec. 22, 1988

[51] Int. Cl.$^4$ .............................................. B29C 47/68
[52] U.S. Cl. .................................... 425/197; 264/171; 264/176.1; 425/199; 425/382.4; 425/462
[58] Field of Search ...................... 425/133.5, 197–199, 425/382.4, 461, 467, 462; 264/171, 176.1

[56] References Cited

U.S. PATENT DOCUMENTS

| | | | |
|---|---|---|---|
| 3,941,544 | 3/1976 | Barth | 425/376.1 |
| 3,959,431 | 5/1976 | Nissel | 425/133.5 X |
| 3,985,654 | 10/1976 | Pall | 210/232 |
| 4,017,240 | 4/1977 | Nelson | 425/192 R |
| 4,087,222 | 5/1978 | Noel | 425/382.4 X |
| 4,113,411 | 9/1978 | Terragni | 425/467 X |
| 4,167,384 | 9/1979 | Shirato et al. | 425/199 X |
| 4,323,339 | 4/1982 | De Kok et al. | 425/467 X |
| 4,619,802 | 10/1986 | Cloeren | 264/171 |
| 4,690,628 | 9/1987 | De Hennau et al. | 425/133.5 |

FOREIGN PATENT DOCUMENTS 2131734 6/1984 United Kingdom .

Primary Examiner—Richard L. Chiesa
Attorney, Agent, or Firm—Ernst H. Ruf

[57] ABSTRACT

An extrusion head for forming a two-part laminated sheet from a single tubular-shaped extrudate stream emitted from the outlet of a single extruder. The stream flow into an enclosed chamber which diverges the stream in width and converges it in thickness. This stream is split by a wedge divider insert which extends across the outlet end of the chamber into multiple parallel, horizontal streams. Each stream then passes through a breaker plate or screen to remove any foreign particles present in the extrudate. A converging preform die in combination with a triangular preform insert converges the upper and lower streams into a single stream at a final die producing the unitary two-part laminate, preferably symmetrical about the horizontal plane. The extrudate preferably is an elastomer and the resulting laminated sheet is used as a tire innerliner. The combined two streams reduces the chance of a discontinuity in one stream lining up with a discontinuity in another stream thereby producing a laminate of high integrity.

9 Claims, 5 Drawing Sheets

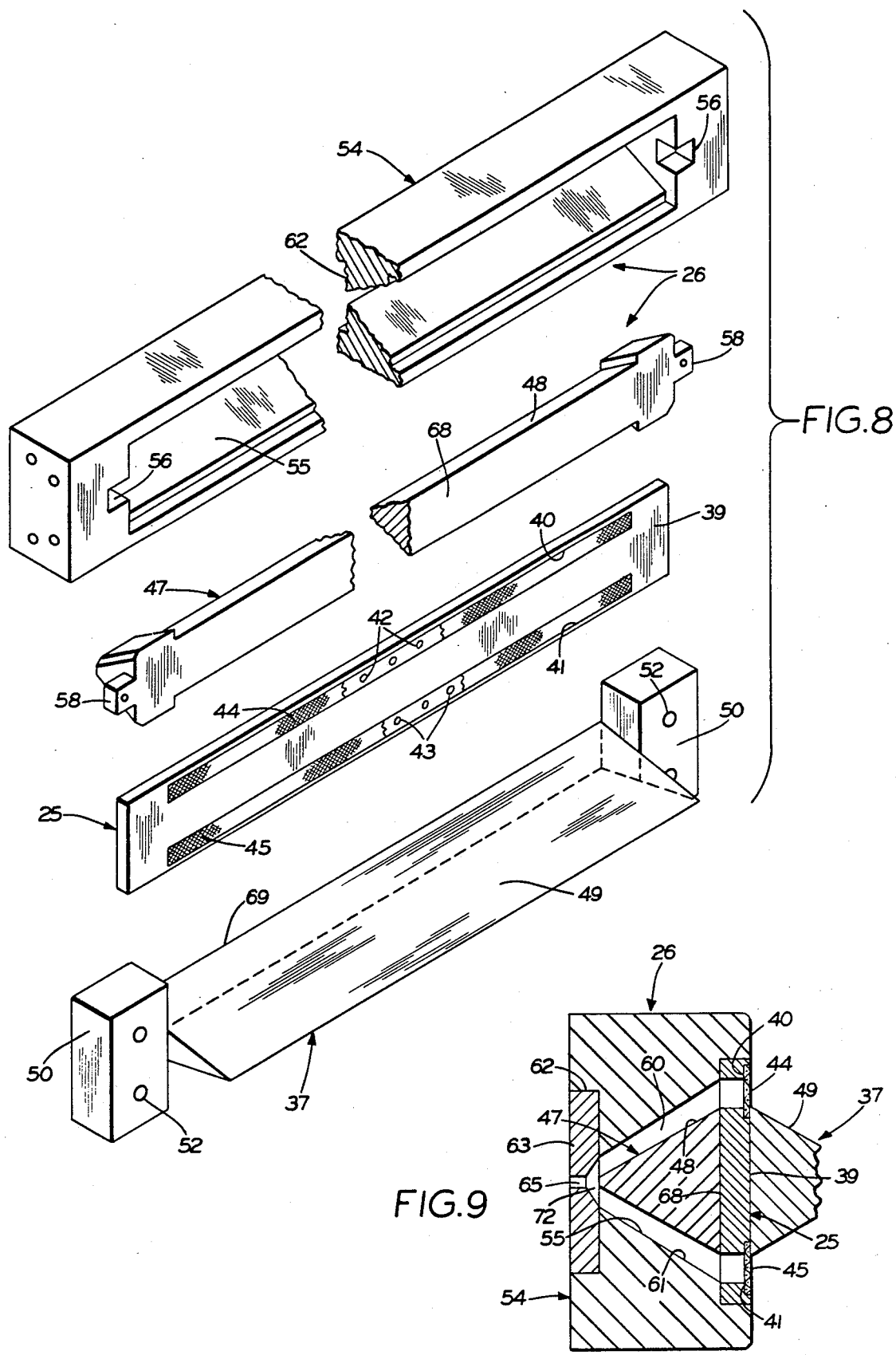

HEAD FOR EXTRUSION OF ELASTOMERIC CONTOUR INNERLINER

TECHNICAL FIELD

The invention relates to extruder heads, and in particular to one which divides a single extrudate stream into split upper and lower symmetrical streams each of which then passes through a screen for removing foreign particles, and then in a final die is converged to produce a unitary two-part laminate to reduce the chance of a discontinuity in one stream lining up with a discontinuity in the other stream.

BACKGROUND ART

In the manufacturing of pneumatic tires certain of the components thereof are formed of elastomeric materials which are extruded into elongated strips or sheets of the extrudate for subsequent placement on a tire building drum. One type of extrudate produces the innerliner of a pneumatic tire which provides the air impervious component of the tire. It is critical that this innerliner be free of imperfections or perforations which could ultimately leak when the tire is subjected to the high internal pressure since the innerliner provides the air retention layer in a tubeless pneumatic tire.

Heretofore, prior art extrusion apparatus and methods generally used two separate extruders and a roller to combine two or more extrudate streams in forming the final extrudate in order to produce a high integrity innerliner. The combining of two or more streams of extrudate is desirable when forming the innerliner since such a construction very much reduces the chance of a discontinuity of one stream lining up with a discontinuity in the other stream thereby producing a laminate or innerliner of a very high integrity, that is, one having no through apertures in the innerliner or extruded sheet.

Examples of known prior art extrusion heads and methods for forming an extruded product are shown in the following patents.

U.S. Pat. No. 3,941,544 discloses an apparatus for the manufacture of thermoplastic extruded profiles wherein the thermoplastic stream from the extruder is divided into a conical flow channel. A lattice is inserted into the flow channel which partitions the channel into a plurality of individual channels. The thermoplastic stream is then combined in a joining section or die before the combined extrudate exits from a nozzle.

U.S. Pat. No. 3,985,654 discloses a filter assembly for filtering fluid polymeric material in which a filtering element is composed of a sheet of filter material which define the sides of a chamber. The filter element is incorporated as a component part of an extrusion die head for removing foreign materials and has a plurality of annular slots or passages through which the polymeric material flows when moving into the main chamber.

U.S. Pat. No. 4,017,240 discloses an extrusion apparatus for extruding sheets of rubber or plastic. A conventional screw extruder has an adapted nozzle attached at a rear flange thereof. The nozzle has a tapered bore which reduces the cross-section of the elastomer material and divides the flow into a plurality of thinner strands which are eventually combined to form a relatively wide sheet having essentially uniform strength across its width.

U.S. Pat. No. 4,619,802 discloses an extrusion apparatus comprising a die and a stream combining adaptor. A thermoplastic stream flows through a pair of channels and converges at the point of confluence of both channels and a combined flow stream or passage is formed. Laminate product flows through a manifold chamber and exits through another channel. Molten thermoplastic streams enter the pair of flow channels and are spread into other channels or manifolds and converge at confluence points to form a layered melt stream.

U.K. Patent Application No. GB2,131,734 discloses an extrusion head for producing flat profiles from rubber or plastic material wherein replaceable inserts are used to define flow channels. The profile of the extruded material is changed by replacing one or both inserts. This system uses a plurality of extuders to form a profiled laminate.

DISCLOSURE OF THE INVENTION

Objectives of the invention include providing an improved extrusion head for extruding a laminated sheet of material such as an elastomer used in the formation of an innerliner for pneumatic tires in which the material is supplied to a chamber in the form of a singular tubular-shaped extrudate from a single extruder, and in which the extrudate is diverged in width and converged in thickness from the incoming extrudate diameter stream as it moves through the chamber.

A further objective of the invention is to provide such an extrusion head in which the converging and diverging stream of extrudate moving through the extrusion head chamber is split by a wedge or triangular-shaped divider insert extending across the discharged end of the chamber into multiple parallel horizontal streams; and in which the streams are passed through screens for removing foreign particles from the extrudate prior to being rejoined upon passing through a die into a single stream to form a unitary laminated sheet of extrudate.

A still further objective of the invention is to provide such an extrusion head in which the separated streams of extrudate upon passing through the screens, are converged by a preformed die and insert into the single stream at the final forming die which is maintained in position by pressure clamping devices in a usual die retaining member.

Another objective of the invention is to provide such an extrusion head which can be mounted in a usual manner on the exit end of a single extruder and placed in a usual production line whereby the final extrudated innerliner then is wound onto a reel for subsequent storage or shipment or may be applied directly to a tire building drum or incorporated into another type of manufacturing operation.

A further objective of the invention is to provide such an extrusion head which is formed with a minimum number of components thereby reducing the maintenance required thereon; and in which the final extrudate is of a high integrity as are extrudates obtained with other prior art extrusion processes requiring more complicated and expensive components.

A further objective of the invention is to provide an improved method for extruding a two-part laminated product by dividing a single tubular-shaped stream of extrudate from a single extruder into a pair of parallel, extremely elongated and thinned streams of extrudate which are passed through breaker bars or screens for removing any foreign particles contained therein prior to being rejoined in a converging die into the two-part laminated extruded product.

These objectives and advantages are obtained by the improved extrusion head of the invention the general nature of which may be stated as including a chamber having an entrance for receiving an incoming supply of extruded material and a discharge end having a discharge passage formed therein, said chamber being defined by spaced walls dimensioned to diverge the width and converge the thickness of the incoming extrude as it moves through the chamber toward the discharge passage; insert means mounted in the discharge end of the chamber for splitting the extrudate into at least a pair of parallel, flat elongated streams of extrudate; breaker means mounted in the discharge end generally adjacent the discharge passage downstream of the insert means for removing any foreign particles present in the extrudate streams; and die means forming the discharge passage for combining the spaced streams of extrudate into a single stream providing a unitary laminated sheet of said extrudate.

These objectives and advantages of the invention are further obtained by the improved method of the invention, the general nature of which may be stated as a method for forming a laminated extrudate sheet from a generally tubular-shaped extrudate, including the steps of supplying a single tubular-shaped stream of extrudate; simultaneously converging the thickness and diverging the width of the tubular-shaped extrudate stream to form a generally elongated flat stream of said extrudate; splitting the flat stream of extrudate into a pair of parallel spaced thinner streams of extrudate; and converging the spaced streams of extrudate through a die to form a two-part laminate sheet.

BRIEF DESCRIPTION OF THE DRAWINGS

A preferred embodiment of the invention illustrative of the best mode in which applicants have contemplated applying the principles, is set forth in the following description and is shown in the drawings and is particularly and distinctly pointed and set forth in the appended claims.

FIG. 8 is an enlarged fragmentary exploded perspective view showing the die assembly, breaker device and divider insert of the improved extrusion head;

FIG. 9 is a enlarged sectional view of the die assembly and breaker bar assembly of the extrusion head.

Similar numerals refer to similar parts throughout the drawings.

BEST MODE FOR CARRYING OUT THE INVENTION

Figure 1:
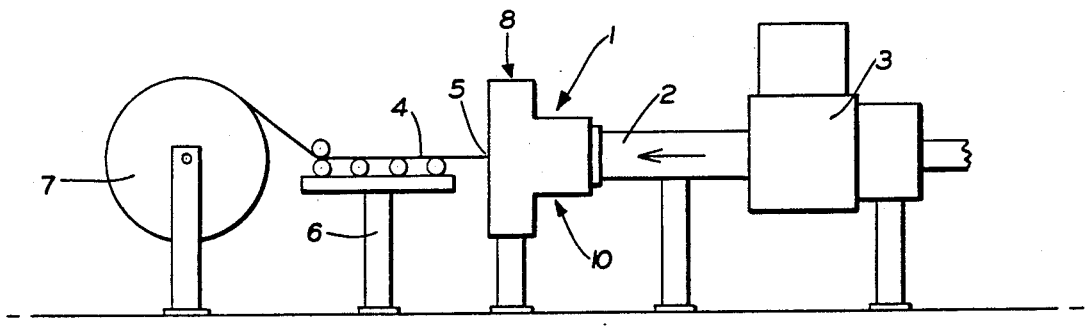
FIG. 1 is a diagrammatic side elevational view of one type of extrusion system in which the improved extrusion head and method may be utilized with the improved extrusion head being shown mounted on the output end of an extruder and the produced, laminated sheet of extrudate being wound into a coil for subsequent storage and shipment.

The improved extrusion head of the invention is indicated generally at 1, and is shown in FIG. 1 mounted on the discharge end 2 of a usual extruder 3. A unitary laminated sheet of extrudate 4 is shown passing through the discharge end 5 of extruder head 1 and being moved by a roller conveyor apparatus 6 or the like for subsequent collection on a reel 7. The extrusion system shown in FIG. 1 is illustrative of merely one type of production process with which extrusion head 1 may be incorporated and is of one type used in the production of an elastomeric innerliner for subsequent use in a tire building procedure. However, extrusion head 1 can be used for extruding other types of materials, and the invention need not be limited for the production of a tire innerliner for pneumatic tires as described in the particular embodiment.

Figure 2:
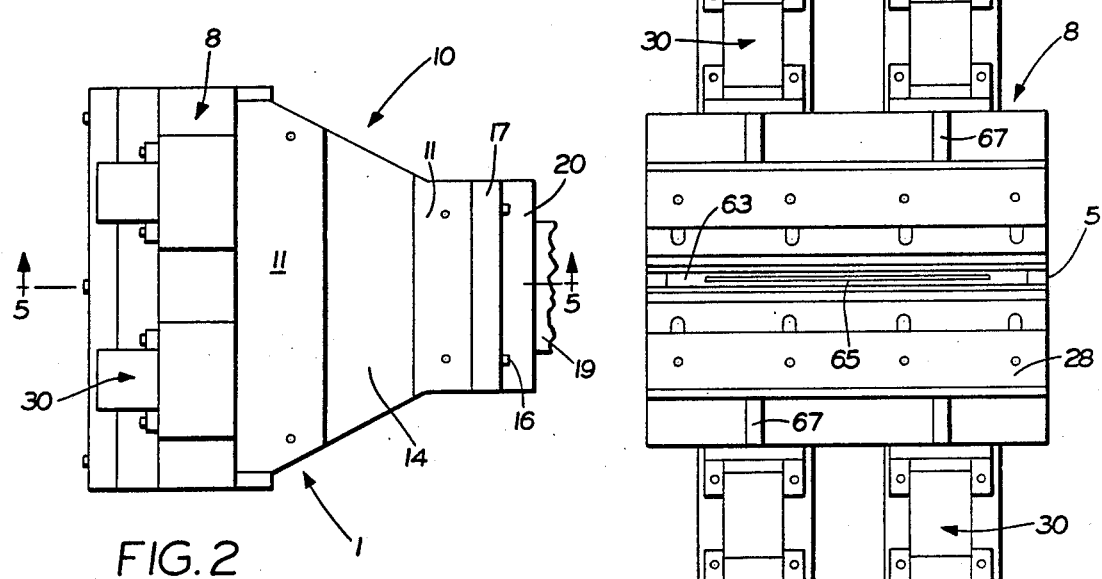
FIG. 2 is a diagrammatic top plan view of the improved extrusion head of the invention.
Figure 3:
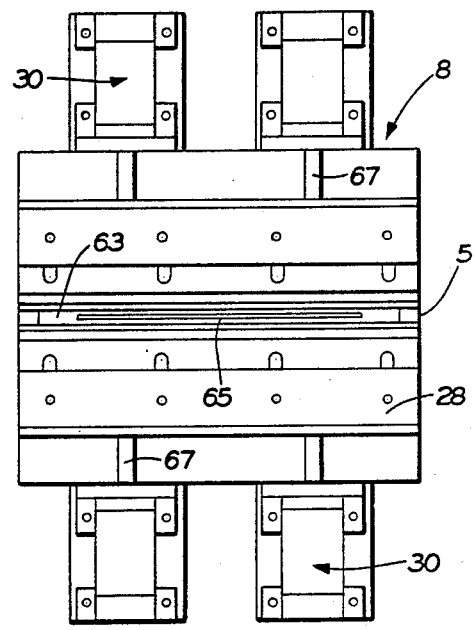
FIG. 3 is a diagrammatic end elevational view of the discharge end of the extrusion head of FIG. 2.
Figure 4:
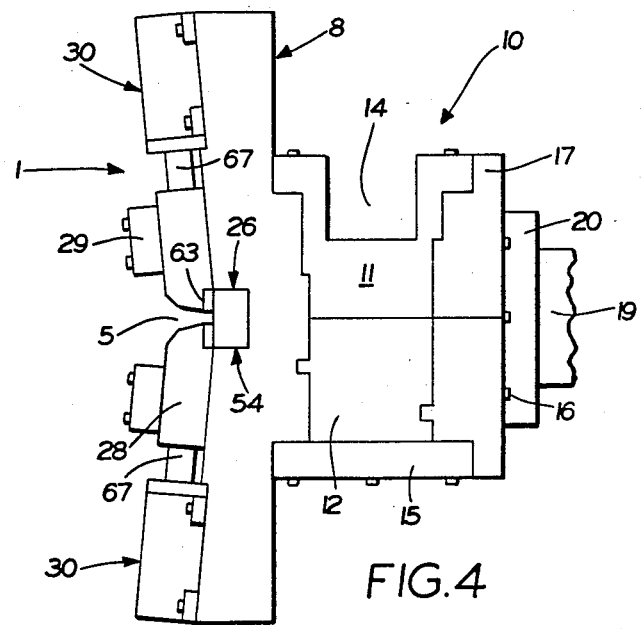
FIG. 4 is a diagrammatic side elevational view of the extrusion head shown in FIGS. 2 and 3.

The general configuration of extrusion head 1 is shown generally diagrammatically in FIGS. 2, 3, and 4 and includes as its main components a housing 10 formed by a pair of housing sections 11 and 12, having internal walls (FIGS. 5–7) which form a flow chamber 13 therein. Housing sections 11 and 12 are secured in an assembled position by a locking wedge 14 and a seal plate 15 which clamp the housing sections together in a fluid tight relationship. An extruder adapter plate 17 is mounted by bolts 16 to housing sections 11 and 12 and a flange plate 20 is secured thereto for attaching the discharge end of a extruder barrel 19 to housing 10. A housing block 8 is mounted on the front or discharge end of housing 10 and is formed with an internal chamber 21, referred to as a separation chamber, which communicates with housing chamber 13.

A breaker device and a die assembly indicated generally at 25 and 26 respectively, are mounted within a recess 22 formed in housing block 8 and are retained therein by a plurality of clamps 28 which are secured in position by a plurality of clamp holders 29 and pressure actuated, preferably hydraulic cylinder assemblies 30.

Figure 5:
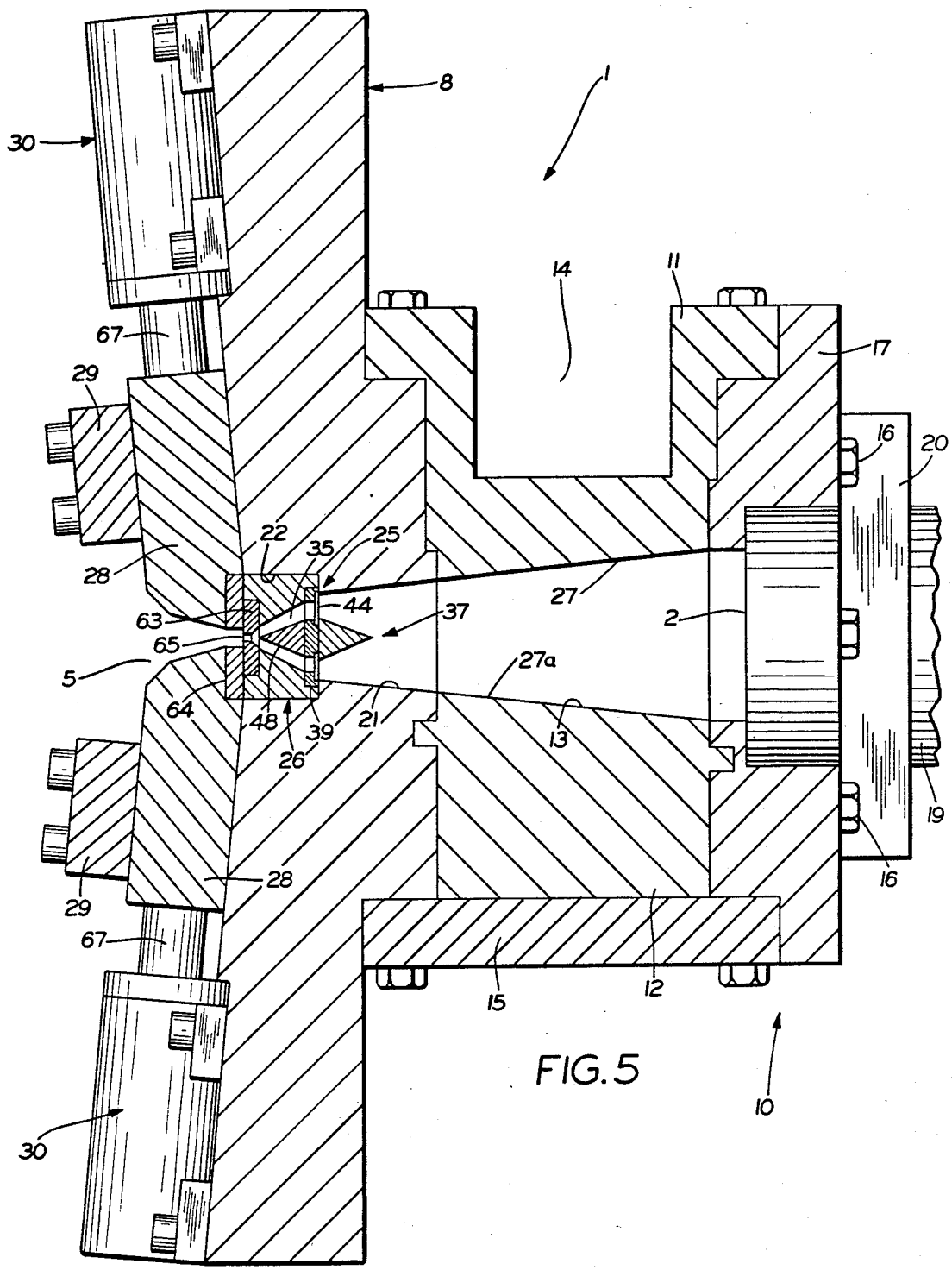
FIG. 5 is an enlarged fragmentary sectional view taken on line 5—5, FIG. 2.
Figure 6:
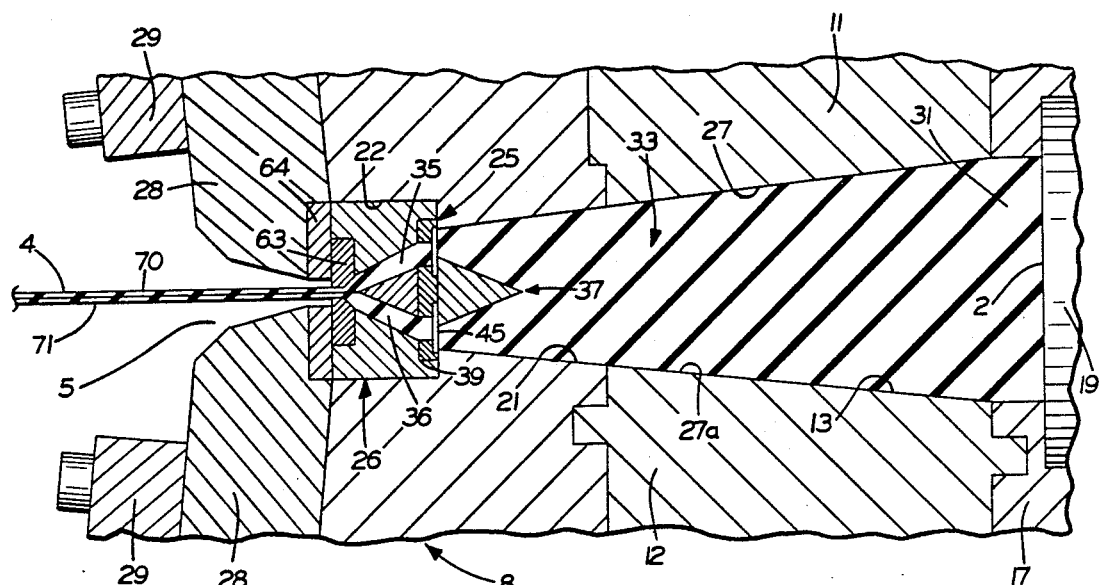
FIG. 6 is a further enlarged fragmentary sectional view of the central portion of the extrusion head as shown in FIG. 5 showing the movement of the extrudate therethrough.
Figure 7:
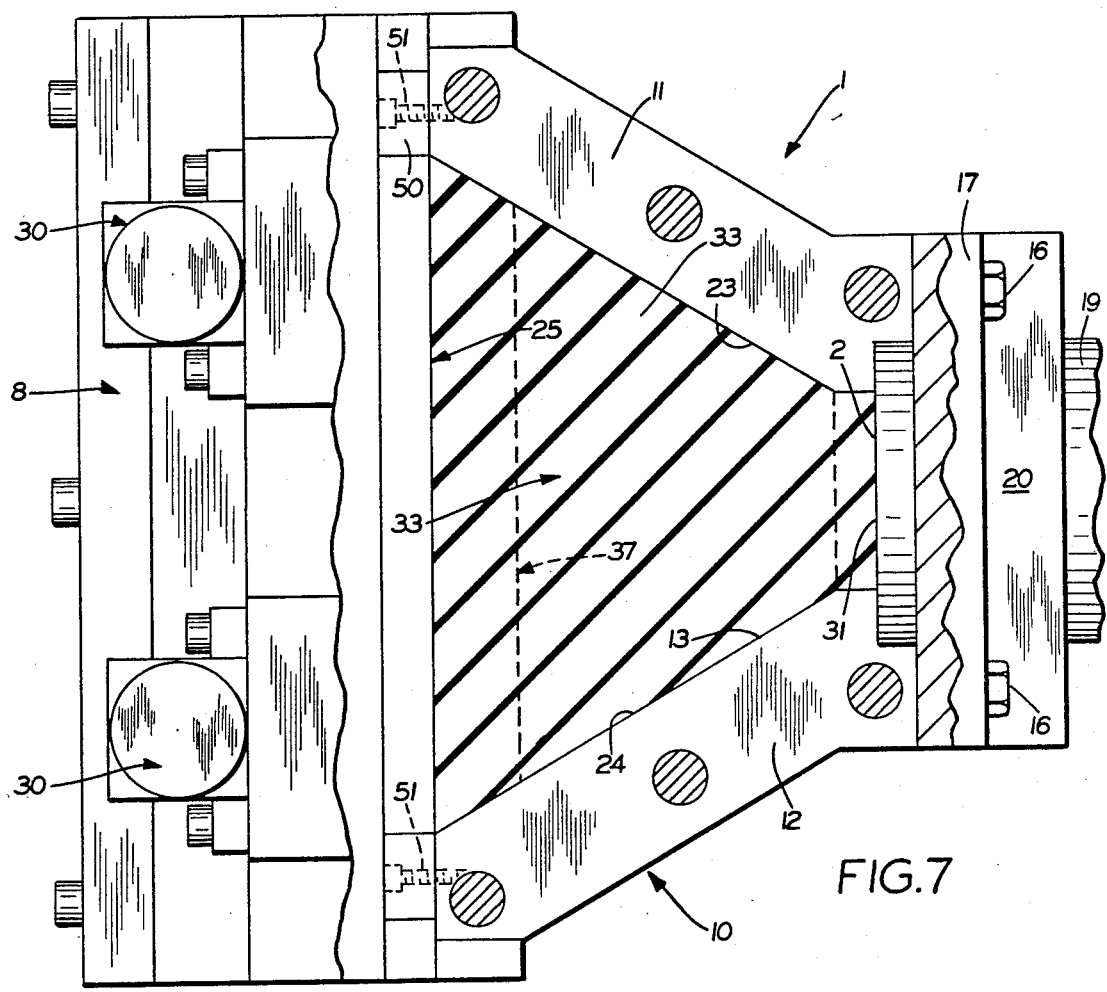
FIG. 7 is an enlarged fragmentary top plan view similar to FIG. 2 of the extrusion head, with portions broken away and in section, showing the interior chamber thereof.

In accordance with one of the features of the invention, chamber 13 as shown particularly in FIGS. 5, 6 and 7, will subject the incoming tubular-shaped stream of extrudate indicated at 31 in FIG. 6, so that the extrudate stream diverges in width while converging in thickness. Thus, the extrudate diverges in width in a generally horizontal plane due to the configuration of chamber side walls 23 and 24 of housing sections 11 and 12 as shown in FIG. 7. Simultaneously, the extrudate converges in thickness or in a vertical plane as shown in FIG. 6 in a direction orthogonal to the diverging of the extrudate stream in the horizontal plane, by the configuration of diverging top of bottom walls 27 and 27A of housing sections 11 and 12.

The converging and diverging elastomeric extrudate stream indicated generally at 33 (FIGS. 6 and 7), then enters separation chamber 21 where it is split into a pair of vertically spaced, parallel, horizontally extending individual streams of extrudate 35 and 36 by a triangular or wedge-shaped divider insert indicated generally at 37. Parallel streams 35 and 36 then pass through breaker device 25 and through die assembly 26 where they are formed into laminate extrudate 4.

Breaker device 25 is shown particularly in FIG. 6, 8, and 9 and consists of an elongated flat plate 39 having upper and lower recessed slots 40 and 41, each of which is formed with a plurality of holes 42 and 43 respectively, which are covered by strips of mesh screen material 44 and 45. Breaker plate 39 is clamped between rear flat surface 69 of divider insert 37 and flat surface 68 of a triangular preform insert 47 which is part of die assembly 26. Divider insert 37 includes the triangular or wedge-shaped dividing front portion 49 which extends into separation chamber 21 for dividing elastomeric stream 33 into parallel streams 35 and 36. Insert 37 is secured at the discharge end of chamber 21 by a pair of integrally formed end posts 50 which are attached by bolts 51 (FIG. 7) to the ends of housing sections 11 and 12, which bolts extend through holes 52 formed in posts 50.

Die assembly 26, in addition to triangular preform insert 47, includes a converging preform insert, indicated generally at 54 (FIG. 8), which is formed with a triangular shaped interior 55 and a pair of end notches 56. A pair of lugs 58 extend outwardly from the ends of preform insert 47 and are received in notches 56 for mounting insert 47 on insert 54. Triangular-shaped front portion 48 of preform insert 47 extends into interior 55 of converging insert 54 and forms a pair of converging, elongated flow channels 60 and 61 as shown in FIG. 9. The outer end of converging insert 54 is formed with a rectangular-shaped recess 62 in which a forming die 63 is rigidly retained by a die clamp pad 64 (FIGS. 5 and 6). Pad 64 is clamped against die 63 by clamps 28 which are mounted on the ends of piston rods 67 of cylinder assemblies 30. Die is formed with an elongated, preferably horizontal, orifice 65 extending substantially across discharge end 5 of extrusion head 1 for controlling the final thickness and width of the laminated extrude 4.

Figure 10:
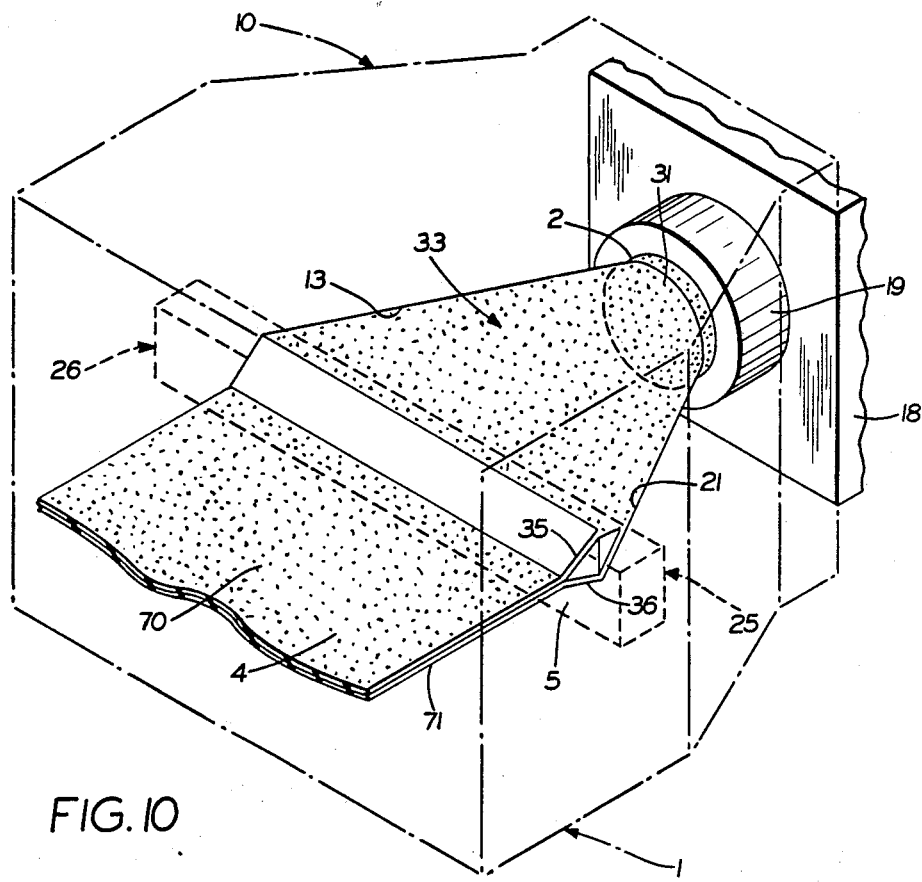
FIG. 10 is a diagrammatic perspective view showing the path of movement of the extrudate through the extrusion head chamber and through the forming die to form the unitary laminated sheet of extrudate.

The operation of extrusion head 1 in performing the methods steps of the invention is best illustrated in FIG. 10 and is described below.

Incoming tubular-shaped extrudate stream 31 upon leaving discharge end 2 of extruder barrel 19 and entering chamber 13, converges in thickness simultaneously as it diverges in width due to the particular configuration of chamber 13 when forming extrudate stream 33. Stream 33, upon entering separation chamber 21, is divided by divider insert 37 into upper and lower parallel extrudate streams 35 and 36. Streams 35 and 36 then pass through breaker device 25 and in particular through holes 42–43 and screens 44–45 which remove any foreign particles trapped in the extrudate streams. Streams 35 and 36 then flow through converging channels 60 and 61 formed between preform die inserts 54 and 47 and meet in a generally overlying relationship in a conical area 72 of die 63 where the streams are extruded through and together at die orifice 65 into upper and lower flat sheets 70 and 71 of extrudate which upon passing through die orifice 65 form the unitary laminated sheet of extrudate 4 (FIG. 10).

As an example, the diameter of incoming tubular extrudate stream 31 is 7½ inches with the extrudate diverging in width to a diameter of 24 inches measured at the final width of die orifice 65, while at the same time converging in thickness from the 7½ inch extruder diameter to a final die thickness ranging from 0.030 inches to 0.07 inches at the final die orifice when forming the final extrudate thickness. These dimensions are representative of a preferred embodiment and can be varied without effecting the concept of the invention.

The extrusion head will include other components such as cooling water channels and various other attachment bolts and clamping members which are not shown in the drawings, but which are standard components well known in the prior art present on many types of extrusion heads. The formation of incoming extrudate stream 31 into two separate streams 60 and 61, which individually pass through the separate screens of breaker plate 39 for removing foreign materials and then subsequently rejoined by the die, reduces the chance of a discontinuity occurring in both streams and lining up as a continuous discontinuity in overlying sheets 70 and 71 of laminate 4. This produces a laminate of very high integrity, that is, one having no aperture or imperfection which extends completely through the sheet which would subject the final tire to possible leakage since the innerliner provides the air impervious membrane or liner to a tubeless pneumatic tire.

Accordingly, the improved extrusion head of the invention which is intended primarily for use in forming preassembled tire components is simplified, provides an effective, safe, inexpensive and efficient device and method which achieves all the enumerated objectives, eliminates difficulties encountered with prior art devices and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved head for extrusion of elastomeric contour innerliner is constructed and used, the characteristics of the improved extrusion head, and the advantageous, new and useful results obtained; the new and useful structures, devices, elements, arrangements, part, combination and method steps are set forth in the appended claims.

What is claimed is:

1. An extrusion head for extruding a laminated sheet of an elastomeric material including:
   (a) a chamber having an entrance for receiving an incoming supply of the elastomeric material and a discharge end, said chamber being defined by spaced walls dimensional to diverge the width and converge the thickness of the incoming elastomeric material as it moves toward the discharge end;
   (b) insert means mounted in the discharge end of the chamber for splitting the elastomeric material into at least a pair of separate streams of said elastomeric material;
   (c) breaker means mounted in the discharge end downstream of the insert means for removing any foreign particles present in the separate streams of elastomeric material; and
   (d) die means located downstream of the breaker means for converging the separate streams of elastomeric material toward an orifice and for maintaining said streams separate until entering the orifice where they are joined to form the laminated sheet of elastomeric material.

2. The extrusion head defined in claim 1 in which the chamber entrance is generally circular in cross-section to form the incoming supply of elastomeric material into a generally cylindrical shape.

3. The extrusion head defined in claim 2 in which the spaced chamber walls includes a pair of spaced converging walls and a pair of spaced diverging walls with respect to the direction of movement of the elastomeric material from the entrance toward the discharge end.

4. The extrusion head defined in claim 3 in which the converging walls provide the elastomeric material with a thickness less than the diameter of the incoming supply; and in which the diverging walls provide the elastomeric material with a width greater than the diameter of the incoming supply as it moves towards the discharge end of the chamber.

5. The extrusion head defined in claim 1 in which the insert means is a wedge-shaped member having a dividing edge extending across the path of movement of the elastomeric material for dividing said material into a generally symmetrical pair of parallel, flat elongated separate streams of elastomeric material.

6. The extrusion head defined in claim 5 in which the die means includes a converging preform insert and a triangular preform insert.

7. The extrusion head defined in claim 5 in which the breaker means includes a plate formed with a plurality of spaced holes for removing the foreign particles from the spaced pair of streams.

8. The extrusion head defined in claim 7 in which the plate has a pair of spaced screen-like members each coinciding with a respective one of the streams.

9. The extrusion head defined in claim 1 in which the die means is mounted on the discharge end of the extrusion head chamber by pressure actuated clamps.

* * * * *